United States Patent Office 3,582,404
Patented June 1, 1971

3,582,404
SOLID-STATE ELECTRICAL CELLS
Ian D. Blackburne, 71 Grevillea Road, Ashgrove, Queensland; Graeme C. Morris, 8 Ruskin St., Taringa East, Queensland; Lawrence E. Lyons, 2126 Moggill Road, Kenmore, Queensland; and Robert G. Hoare, Gowrie Private Hotel, Canberra, Australian Capital Territory, New South Wales, Australia
No Drawing. Filed Nov. 6, 1967, Ser. No. 680,950
Claims priority, application Australia, Oct. 27, 1966, 13,144/66
Int. Cl. H01m *11/00, 15/06*
U.S. Cl. 136—83                         4 Claims

ABSTRACT OF THE DISCLOSURE

In a solid-state electrical cell of the type having a compressed pellet containing a charge transfer complex between two electrodes, the pellet incorporates a polar liquid, preferably water.

---

This invention relates to what will be called "solid-state" electrical cells. Such cells using as electrolyte charge transfer complexes have been described, the complexes involving, on the one hand, iodine or tetracyanoquinodimethane (TCNQ) and, on the other hand, one of several organic electron donor substances. ("Journal of the Electrochemical Society," vol. 114, No. 4, April 1967, pages 323–329: "Chemical Engineering News," July 18, 1966, page 20.)

In these prior cells, the solid electrolyte in compressed pellet form is mounted between two electrodes. Electrochemical reaction proceeds between the electrolyte and one electrode, the other electrode is electrochemically inactive and serves as an ohmic contact only. This contrasts with normal aqueous systems in which both electrodes are reactive, one producing anions and one cations. In the solid-state system only one type of ion, usually anions, is produced. The "inactive" electrode merely supplies carriers, usually electrons, to neutralize the ions not discharged at the "active" electrode.

All such prior solid-state cells have been characterized by short circuit currents in the range from about $10^{-7}$ amps to $5 \times 10^{-3}$ amps.

In the higher part of this range the currents tended to drop very rapidly to lower values with aging of the cell.

It is an object of this invention to increase the short-circuit currents of these solid-state cells very considerably and thus increase their useful range of application, and to provide cells in which the cell voltage remains more constant with time.

The invention is based on the discovery that in this type of cell the addition of a polar liquid, such as water, to the solid electrolyte pellet profoundly affects the properties of the cell, in particular by raising the short-circuit current available by a factor of the order of a thousand.

The invention therefore comprises a "solid-state" electrical cell of the type having a compressed pellet containing a charge transfer complex between two electrodes characterized in that the material of said pellet incorporates a polar liquid. The polar liquid is preferably water.

Some experimental results will now be given showing the effects of addition of water to various cells. In each case the electrolyte pellets were made by dry-mixing the constituents and pressing them at 4,000–8,000 lbs./square inch pressure. Where there was more than one electrolyte component, the components were mixed in about equal quantities of weight. Electrodes in each case, unless otherwise stated, were magnesium.

| Electrolyte | Voltage (volts) | Short-circuit current | Comments |
|---|---|---|---|
| (a) Iodine | 0.8 | 10 μA.9 | After disiccation. |
|  | 1.14 | 31 μA. | After 2 minutes exposure to atmosphere. |
|  | 1.35 | 60–80 ma. | 1 drop water added. |
| Active electrode Al | 0.83 | 60 μa. | Dry. |
| Active electrode Sn | 0.11 | 3.3 μa. | Dry. |
| (b) Iodine | 1.48 | 32 μa. | Dry. |
|  | 1.60 | 150 ma. | 1 drop water added. |
|  | 1.55 | 50 ma. | After 5 miutes. |
| Pyranthrone | 1.48 | 5.4 ma. | 15 minutes vacuum desiccation. |
|  | 1.50 | 200 ma. | Second drop of water added. |
|  | 1.50 | 94 ma. | After 4 minutes. |
| (Active electrode Al) | 0.86 | 1.49 ma. | Dry. |
| (c) Iodine | 1.45 | 60 μa. |  |
|  | 1.50 | 55 μa. | 30 minutes ageing. |
|  |  | 100 ma. | 1 drop water added. |
| Di-bromo anthracene |  | 45 ma. | After 45 seconds. |
| (d.b.a.) | 1.42 | 2.5 ma. | 30 minutes vacuum desiccation. |
|  |  | 190 ma. | Second drop of water added. |
|  |  | 100 ma. | After 120 seconds. |
| (d) | 1.32 | 1.2 ma. | Dry. |
|  |  | 380 ma. | Several drops of water added. |
| KI-I₂-d.b.a | 1.50 | 10 ma. | 2 hours ageing. |
|  | 1.15 | 250 ma. | Further water added. |
|  |  | 80 ma. | 3½ minutes ageing. |
| (e) I₂-paraffin | 0 | 0 | Addition of water had no effect. |
| (f) | 1.35 | 0.4 μa. | After desiccation. |
|  | 0.94 | 18 μa. | 12 minutes ageing. |
|  | 1.72 | 12 μa. | In moist atmosphere. |
| I₂-naphthalene | 1.5 | 160 ma. | 1 drop water added. |
|  |  | 45 ma. | 9 minutes ageing. |
| (g) | 1.10 | 10.6 μa. | After desiccation. |
|  | 1.25 | 12.5 μa.9 | Moist atmosphere. |
|  | 1.30 | 13.5 μa. | 2 minutes ageing. |
| I₂-methylene blue | 1.50 | 150 ma. | 1 drop water added. |
|  | 1.66 | 150 ma. | 7 minutes ageing. |
|  | 1.58 | 150 ma. | 20 minutes ageing. |
| (h) | 1.25 | 20.5 μa. | After desciccation. |
|  | 1.35 | 45 μa. | In moist atmosphere. |
| I₂-polyvinyl pyridine | 1.60 | 90 ma. | 1 drop water added. |
|  | 1.00 | 38 ma. | 15 minutes ageing. |

NOTE.—μa. = microamps; ma. = milliamps.

From the above examples it will be seen that addition of 1 drop (about 0.15 cc.) of water raises the short-circuit current spectacularly except in case (e) where the electrolyte remained inactive, probably because the paraffin prevented any penetration. Cases (f) (g) indicate that while exposure to a moist atmosphere has some effect, this is small compared to that caused by addition of liquid water.

The general pattern shown by cases (b)(c)(d)(f)(g)(h) indicates that ageing decreases the first affect of water addition, but the short-circuit current does not drop to anywhere near the "dry" current. Later further addition of water raises the current again and ageing returns it to a new value higher than the first aged value.

Case (g) is particularly favourable. The iodine-methylene blue electrolyte gives a high short-circuit current and a nearly constant voltage during ageing.

While water has been used as the additive in all the above examples, other *polar* liquids such as dimethylformamide or tetrahydrofuran may be used instead, and give similar results.

The active electrode may be aluminium, tin or zinc instead of magnesium, the voltage depending on the metal used, as is disclosed in the papers referred to above, and illustrated in Examples (a) and (b) above. The addition of polar liquid to the pellets has similar effects, the metal of the active electrode not appreciably affecting the ratio of short circuit currents in "dry" and "wet" states.

The second electrode may be carbon or nickel or other highly conductive substance. As this electrode gives only ohmic contact, a wide variety of materials may be used.

What we claim is:

1. A solid-state electrical cell of the type having a compressed electrolyte pellet containing a charge transfer complex and two conductive electrodes; one active and one inactive, contacting said pellet on either side thereof said charged transfer complex comprising a first compound selected from the group consisting of iodine and tetracyanoquinodimethane; a second compound selected from the group consisting of pyranthrone, di-bromo anthracene, naphthalene, methylene blue and polyvinyl pyridine, and a polar liquid.

2. The cell of claim 1 wherein the polar liquid is a member selected from the group consisting of water, dimethylformamide and tetrahydrofuran.

3. The cell of claim 1 wherein the initial short-circuit current of the cell is at least 50 milliamps prior to the incorporation of the polar liquid.

4. The combination of claim 1 and a polar liquid introduced into said pellet; the cell being such that the ratio of short-circuit currents of the cell after introduction and before introduction of said polar liquid is at least 100:1.

References Cited

UNITED STATES PATENTS

| | | | |
|---|---|---|---|
| 2,874,204 | 2/1959 | Morehouse et al. | 136—100 |
| 2,905,740 | 9/1959 | Smyth et al. | 136—83 |
| 3,057,760 | 10/1962 | Dereska et al. | 136—137 |
| 3,346,423 | 10/1967 | Smyth et al. | 136—153 |
| 3,352,720 | 11/1967 | Wilson et al. | 136—137 |

OTHER REFERENCES

Herman et al., Tiny battery gives 1.5 volts, Chemical and Engineering News, pp. 20 and 21, July 18, 1966, copy in 136–137.

DONALD L. WATTON, Primary Examiner

U.S. Cl. X.R.

136—137, 153